US010350528B2

(12) United States Patent
Spatz et al.

(10) Patent No.: US 10,350,528 B2
(45) Date of Patent: Jul. 16, 2019

(54) VEHICLE AIR BAG FILTER WITH GROOVED WIRE

(71) Applicants: Brian Spatz, Jersey City, NJ (US); Connor Arnell, Jersey City, NJ (US); Kurry Emmons, Branchburg, NJ (US)

(72) Inventors: Brian Spatz, Jersey City, NJ (US); Connor Arnell, Jersey City, NJ (US); Kurry Emmons, Branchburg, NJ (US)

(73) Assignee: Metal Textiles Corporation, Edison, NJ (US)

( * ) Notice: Subject to any disclaimer, the term of this patent is extended or adjusted under 35 U.S.C. 154(b) by 115 days.

(21) Appl. No.: 15/702,153

(22) Filed: Sep. 12, 2017

(65) Prior Publication Data

US 2018/0093212 A1   Apr. 5, 2018

Related U.S. Application Data

(60) Provisional application No. 62/403,980, filed on Oct. 4, 2016.

(51) Int. Cl.
*B01D 39/00* (2006.01)
*B01D 39/12* (2006.01)
(Continued)

(52) U.S. Cl.
CPC ......... *B01D 39/12* (2013.01); *B01D 39/2027* (2013.01); *B60R 21/26* (2013.01);
(Continued)

(58) Field of Classification Search
CPC .... B01D 39/00; B01D 39/12; B01D 39/2027; B01D 2279/10; B60R 21/26;
(Continued)

(56) References Cited

U.S. PATENT DOCUMENTS 3,713,323 A   1/1973  Ivanier
4,122,015 A   10/1978 Oda et al.
(Continued)

FOREIGN PATENT DOCUMENTS

JP        2002-301317       10/2002
WO    WO2013/052325        4/2013
(Continued)

*Primary Examiner* — T. Bennett McKenzie
(74) *Attorney, Agent, or Firm* — Raymond J. Lillie

(57) ABSTRACT

A filter for use in safety air bags as employed in vehicles and the like comprises one or more compressed grooved wires, wherein the wire or wires have an outer diameter of about 0.010 to 0.050 inches and the grooves have a depth in the range of 0.001 to about 0.005 inches. A plurality of grooves, preferable about 10-14, of about 0.018 diameter stainless steel wire, having a depth of about 0.001 inches to about 0.0025 inches, are equally spaced about the periphery of the wire, which is cylindrical. The pitch of the groove spacing may differ for different implementations. The wire outer surface between grooves may have a radius, preferably about 0.0025 inches in a wire of about 0.018 inches diameter. A stainless steel wire is preferred, but other wire metals may be used according to a given implementation.

4 Claims, 3 Drawing Sheets

(51) Int. Cl.
    *B01D 39/20*     (2006.01)
    *B60R 21/26*     (2011.01)
    *B29C 43/00*     (2006.01)
    *B60R 21/262*     (2011.01)
    *B60R 21/261*     (2011.01)

(52) U.S. Cl.
    CPC ........ *B01D 2279/10* (2013.01); *B29C 43/006* (2013.01); *B60R 21/261* (2013.01); *B60R 21/262* (2013.01); *B60R 2021/26011* (2013.01)

(58) Field of Classification Search
    CPC ................ B60R 21/261; B60R 21/262; B60R 2021/26011; B29C 43/006
    USPC .......................................................... 55/526
    See application file for complete search history.

(56) References Cited

U.S. PATENT DOCUMENTS

| | | |
|---|---|---|
| 4,211,104 A | 7/1980 | Barnabo et al. |
| 7,559,146 B2 | 7/2009 | Greenwood |
| 8,113,027 B2 | 2/2012 | McDonald et al. |
| 2009/0079104 A1* | 3/2009 | Greenwood ........... B01D 39/12 264/103 |
| 2014/0250847 A1 | 9/2014 | Emmons et al. |
| 2017/0312670 A1* | 11/2017 | Matsumoto ............ B01D 39/12 |

FOREIGN PATENT DOCUMENTS

| | | | |
|---|---|---|---|
| WO | WO2016/068250 | 5/2016 | |
| WO | WO-2016068250 A1 * | 5/2016 | ............. B01D 39/12 |

\* cited by examiner

VEHICLE AIR BAG FILTER WITH GROOVED WIRE

CROSS-REFERENCE TO RELATED APPLICATIONS

This application claims the benefit of U.S. provisional application No. 62/403,980 filed Oct. 4, 2016 in the name of Brian Spatz et al., assigned to the assignee of the instant application and incorporated by reference in its entirety herein.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

Field of the Invention

This invention relates to vehicle safety air bag mesh filters with improved wires for filtering hot gases generated by the deployment of the air bags.

Automotive air bags are in wide use and which form a passive restraint system to enhance passenger safety in automobiles and other vehicles or modes of transportation. Air bags comprise a bag or similar bladder that is inflated in short time periods using compressed or chemically generated gas using relatively high gas pressures, e.g., 20-30 MPa (MPa=145 psi), and temperatures. Such gases may have a known composition, for example, as disclosed in U.S. Pat. No. 5,525,170, incorporated by reference herein. These gases generate an explosive force that the filter needs to stabilize as well as contain particles generated by such forces. As these generated forces increase with newer units, the filter needs to withstand such greater forces.

Such filters are intended to remove burning particles of the gas propellant ignited to inflate the air bag. Depending upon the application, the generated pressure can be applied for a relatively short duration, e.g., milliseconds. Such forces may distort or otherwise deform the filter, decreasing its effectiveness.

Description of Related Art Including Information Disclosed Under 37 CFR 1.97 and 1.98

In some filter designs, the hoop strength of the filter is critical. For example, see U.S. Pat. No. 6,277,166, incorporated by reference herein, wherein the wire mesh filter is formed with ribs extending outwardly from the filter to increase the hoop strength of the filter. Also, see U.S. Pat. No. 7,559,146, incorporated by reference herein, which also provides a solution to the hoop strength of such filters by providing at least one hoop wire around the exterior of the filter interlocked with the wire mesh filter when the filter is compression molded. While this design exhibits a problem with hoop strength to which this patent is directed, there are other designs of air bag filters that do not have such problems.

Also, knitted tubular wires have been used for filter manufacture for many decades. The problem with such knitted wire tubes is commonly referred to as "chips." Because the knitted wire mesh is made by interlocking omega shaped loops, when the continuous length mesh tube is cut, many half loops or "U-shaped chips" remain dangling on the cut edge of the mesh. These chips can potentially fall off in service creating many problems in an air bag application, i.e., the loose chips can be blown off during the inflation event, and burn through the bag, injuring an occupant. The prior art recognizes this problem and provides a solution by using a different kind of wires. The wires used in such filters comprise one or more continuous lengths of a given mass and may be corrugated with undulating coplanar sinusoidal waves in each wire. Filters of this design have been in use commercially for many years.

Such prior art filters with continuous one piece corrugated wires have a problem different than the hoop strength and chip problems of knitted wires. The problem with such corrugated steel wires is that the layers of the molded compressed length of wire forming the filter tend to separate under tensile forces, i.e., in response to explosive pressures of the air bag deployment gases, not present in the knitted wire filters. Commonly owned US publication 2014/0250847, incorporated by reference herein in its entirety, discloses a compressed wire filter that is designed to address this problem using a different wire configuration.

Thus, when exposed to the explosive forces in an air bag environment, prior art filters of the continuous wires with corrugated waves exhibit problems in that particles generated during the explosion expansion of the air bags may still be released into the automobile cabin. The present invention is a recognition by the present inventors that such filter wires can be modified as disclosed herein to further capture more particles than the prior art wires and thus result in a safer air bag.

U.S. Pat. No. 8,113,027 discloses a method and device for the manufacture of multiple grooved wire.

U.S. Pat. No. 3,713,323 discloses a die for cold drawing of a metal wire.

U.S. Pat. No. 4,122,015 discloses a fortified metal filter and its preparative procedure. The filter comprises stainless steel wires prepare by crushing the edges of the wire. The wires are composed of numerous polygon cross-sections. The filter is formed by diffusing the metal into a fused part by heating and compressing the system simultaneously. A pressure of about 20 kg/m2 is used for a volume of about 5-20 mm×1000 mm×1000 mm with a pore ratio of about 99%. Such a filter is not suitable for an automotive air bag application wherein the compression forces forming an air bag filter are significantly higher so that the filter can withstand the significant higher pressures involved created by the air bag deployment.

U.S. Pat. No. 4,211,104 discloses a cold drawing die for drawing polygon shapes in round bar stock. Pure polygon and hybrid polygon shapes are disclosed.

BRIEF SUMMARY OF THE INVENTION

The above problems with the prior art are substantially resolved by a filter according to an embodiment of the present invention wherein a compressed wire mesh vehicle air bag filter comprises a length of at least one wire having at least one groove extending along the longitudinal length of the wire, the at least one groove being arranged for capturing released particles in response to the air bag expansion during use, wherein the at least one wire is formed into said compressed air bag filter.

In a further embodiment, the wire has an outer diameter of about 0.010 to 0.050 inches and the at least one groove has a depth d in the range of 0.001 to about 0.005 inches.

In a further embodiment, the wire is one of steel or stainless steel.

In a further embodiment, the wire includes a plurality of said at least one groove spaced around the circumference of the wire.

In a further embodiment, the plurality of grooves having a pitch spacing there between about the circumference of the wire in the range of about 0.002 inches to about 0.006 inches.

A further embodiment comprises a plurality of different lengths of wire.

In a further embodiment, the wire has 10-14 grooves, is about 0.018 inches in diameter, the grooves have a depth d of about 0.001 to about 0.0025 inches and the wire between adjacent grooves has an outer surface convex radii of about 0.0025 inches.

In a further embodiment, the groove root has a radius in the range of about 0 inches to about 0.0008 inches.

In a further embodiment, the at least one groove extends for the length of the wire.

DETAILED DESCRIPTION OF THE INVENTION

Figure 1:
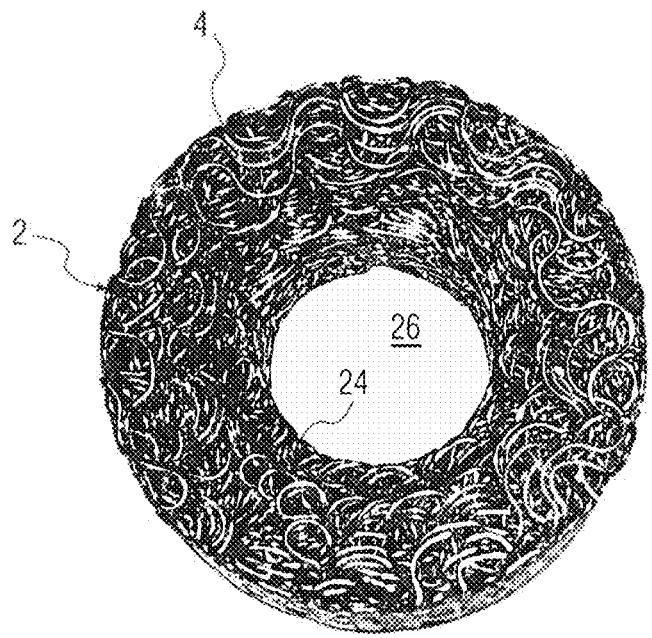
FIGS. 1 and 2 are photographs of respective plan and side elevation views of a filter made with compressed continuous length wire having grooves according to an embodiment of the present invention.
Figure 2:
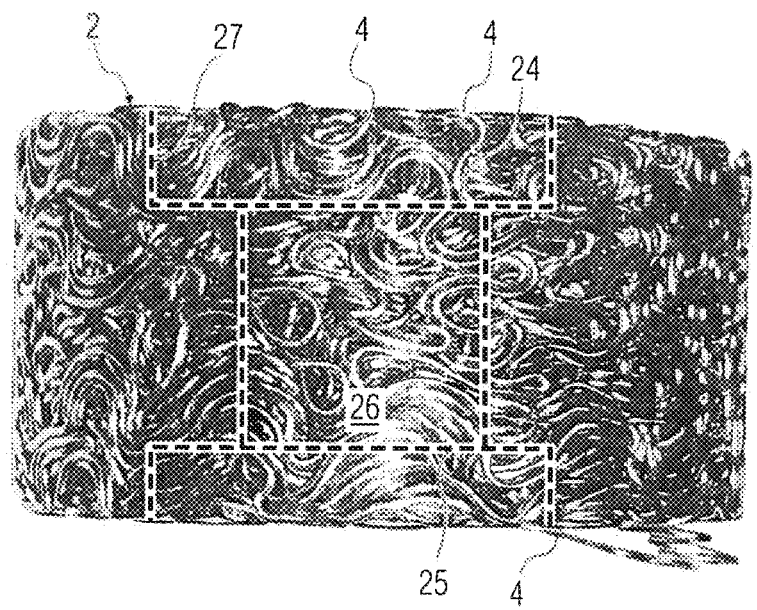

In FIGS. 1 and 2, filter 2 is formed from grooved wires 4, according to the present invention, crushed and molded in a die as disclosed in commonly owned publication US2014/0250847 in the name of Emmons et al. published Sep. 11, 2014 incorporated by reference in its entirety herein. The filter 2 has a recessed inner shoulder 24 in communication with the filter central cylindrical through bore 26 and terminates internal ID wall 27. The filter has a second shoulder 25, FIG. 2. The shoulders 24 and 25 face opposing sides of the filter and are both in communication with central through bore 26. The bore 26 is formed by a mandrel. The filter 2 is formed by the high pressure applied to a plunger as disclosed in the referenced document. The filter has a predetermined mass and density corresponding to the amount of wire 4 employed as known in this art.

A filter formed with a continuous length of wire having a sequence of substantially sinusoidal waves of crushed continuous length of wire is known in the prior art. The wire is crushed into non-interlocked layers that tend to separate in the presence of a tensile or other similar loads during air bag deployment or the like. Such loads may be formed by the deployment forces when the air bag is blown up in response to explosive forces upon activation. The wires may exhibit sinusoidal waves adjacent to one another in overlying non-interlocked layers according to a given implementation. In this case, the waves typically form a nested layered relationship. Such a nested layered relationship permits the layers of wires to easily separate permitting unwanted gas components to pass through the filter due to enlarged spaces between the wires created by the separations. Such a filter has been commercially available for many years. The problems with such a filter have been met by the commonly owned publication noted above.

In FIGS. 1 and 2, novel filter 2 according to an embodiment of the present invention has the same mass, weight and shape of the filter of prior art filters. Filter 2 is formed of the inventive wire, FIGS. 3-9, of substantially the same length of wire as prior art filters.

Figure 3:
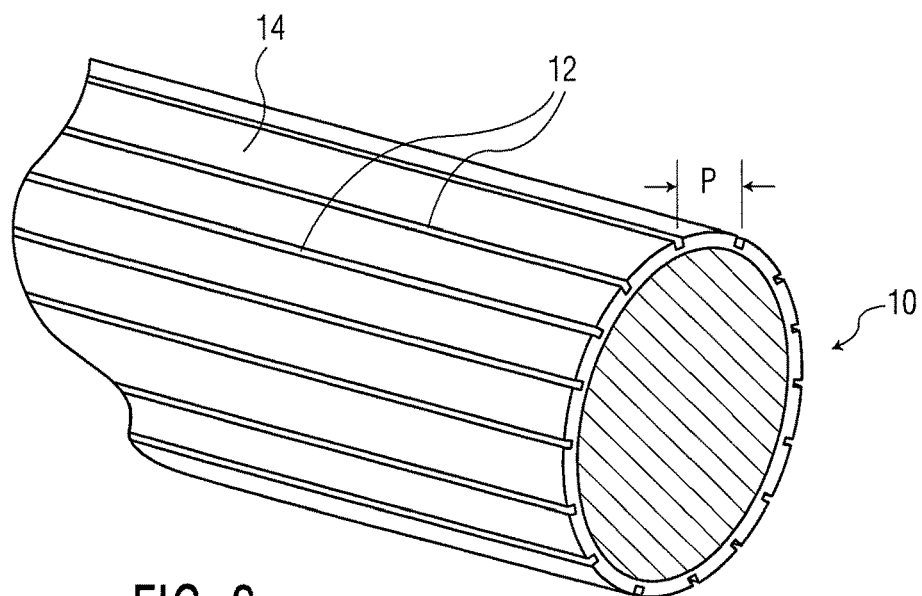
FIG. 3 is a perspective view of a wire according to an embodiment of the present invention illustrating a plurality of grooves in its external circumferential surface of the wire.
Figure 4:
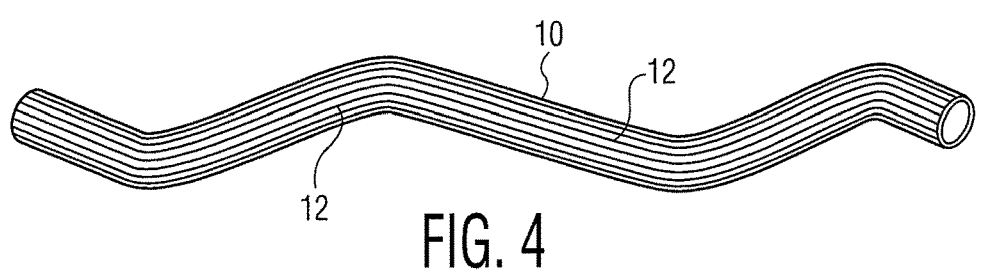
FIG. 4 illustrates a length of grooved wire with a plurality of grooves in its external circumferential surface.

In FIG. 3, wire 10 has a plurality of grooves 12 in its circumferential surface 14. In this embodiment the grooves 12 are identical. However, in other embodiments the grooves may differ from each other according to a given implementation. The grooves extend for the full length of the wires, but may be less than such lengths in a given implementation. The grooves may differ in shape as shown in FIGS. 6, 7, 8 and 9. The difference may be in groove width w, FIG. 6, and/or depth d. Also the root shape of the grooves may differ in radii as shown by radii R1, R3, R4 and R5 in FIGS. 6-9. The different widths, depths and radii may be determined by empirical test methods using different pyrotechnics to deploy the air bags, metals used in the wires and the size of the wires. All of such variables are a function of a given implementation of a given air bag and its pyrotechnics and structures.

Figure 5:
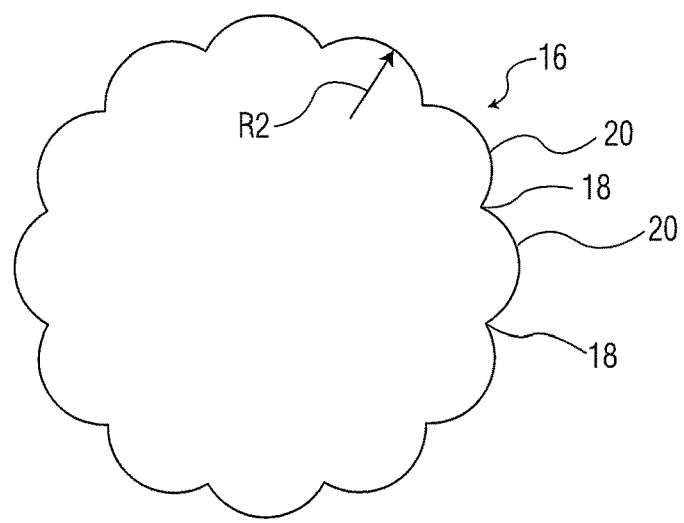
FIG. 5 is an end diagrammatic view of a wire according to an embodiment of the present invention.
Figure 6:
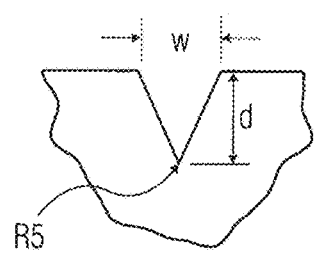
FIGS. 6, 7, 8 and 9 are diagrammatic cross section views of a groove in a wire illustrating different groove shapes.
Figure 7:
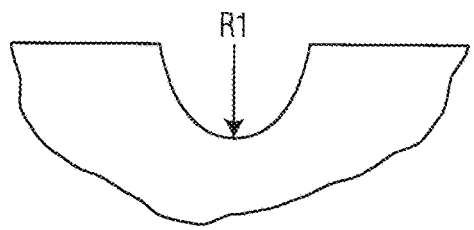
Figure 8:
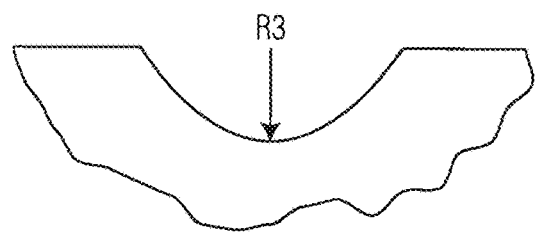
Figure 9:
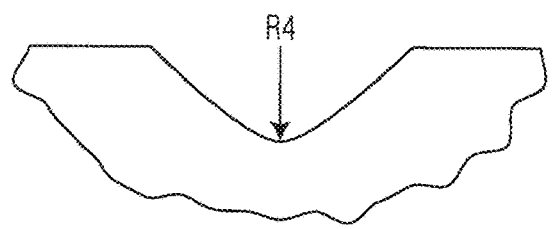

In FIG. 5, a diagrammatic end view of an embodiment of a stainless steel wire 16 is illustrated having 12 equally spaced identical grooves 18 wherein the 12 outer surfaces 20 of the wire 16 between the grooves 18 is convex with a preferred radius R2 of about 0.0025 inches, where the wire 16 is about 0.018 inches in overall diameter. The root region of the grooves 18 have a preferred radius (such as depicted by radii R1, R3, R4 and R5 of FIGS. 6-9) of about 0.0004 inches, but can vary in range from 0 inches to about 0.0008 inches. The above embodiment is by way of example as other embodiments of wires of the same or different material, may differ, especially when such filters have different filter size and shapes.

The pitch p of the groove spacing, FIG. 3, while the same in FIG. 3 embodiment for all grooves, may differ in a given wire from groove to groove or from that of different wires in a given filter. Such spacing may range from about 0.002 inches to about 0.006 inches. Such different spacings or wire materials and/or dimensions would depend upon a given implementation obtained by empirical data or actual test data based on different size air bags, different wire filter configurations, and different explosive forces involved.

While particular embodiments have been disclosed, it should be understood that such embodiments are given by way of example. Other embodiments formed by obvious variations of the disclosed embodiments may be created by those of ordinary skill. For example, wire size, material, groove sizes, shapes and pitches, mass of wire used, number of wires used, shape of the filter, and so on including different pressures, dimensions and values from that given herein may be employed within the scope of the present invention. It is intended that the scope of the invention be defined by the appended claims, the description herein being given by way of illustration and not limitation.

What is claimed is:

1. A compressed wire mesh vehicle air bag filter, comprising:
 a length of at least one cylindrical wire having 10 to 14 grooves extending along the longitudinal length of the wire, wherein the at least one wire is 0.018 inches in diameter, each of the grooves has a depth of from 0.001 to 0.0025 inches, and the at least one wire between adjacent grooves has an outer surface convex radius of 0.0025 inches, wherein the grooves are arranged for capturing released particles in response to the air bag expansion during deployment.

2. The filter of claim 1 wherein the at least one wire is manufactured from a material selected from the group consisting of steel or stainless steel.

3. The filter of claim 1 wherein each of the grooves has a pitch spacing about the circumference of the wire in the range of from 0.002 inches to 0.006 inches.

4. The filter of claim 1 comprising a plurality of said lengths of wire.

* * * * *